United States Patent
Bloechl et al.

(10) Patent No.: US 6,611,140 B1
(45) Date of Patent: Aug. 26, 2003

(54) MAGNETIC SENSING UNIT FOR DETECTING NANOMETER SCALE DISPLACEMENTS OR FLECTIONS

(75) Inventors: Peter Bloechl, Goslar (DE); Christophe Rossel, Richterswill (CH); Michel Willemin, Affoltern am Albis (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/095,179

(22) Filed: Mar. 8, 2002

(51) Int. Cl.[7] .............................. G01B 7/14; G01R 33/06
(52) U.S. Cl. .................... 324/207.21; 250/306
(58) Field of Search ............... 324/207.21, 252, 324/226, 244, 260; 250/306, 367; 73/105, 777; 438/17, 14

(56) References Cited

U.S. PATENT DOCUMENTS 5,444,244 A * 8/1995 Kirk et al. ................. 250/306
5,856,617 A * 1/1999 Gurney et al. ............... 73/105
6,436,853 B2 * 8/2002 Lin et al. .................... 438/800

* cited by examiner

*Primary Examiner*—Edward Lefkowitz
*Assistant Examiner*—Subhash Laveri
(74) *Attorney, Agent, or Firm*—William D. Gill (57) ABSTRACT

A magnetic sensing unit for measuring displacements on a nanometer scale is provided. A moveable part and a fixed part of a microdevice magnetic sensing unit comprises a magnetic element having a magnetic field and a magnetic sensor, the magnetic element being located on the moveable part and the magnetic sensor on the fixed part, or alternatively, the magnetic sensor being located on the moveable part and the magnetic element on the fixed part. The magnetic sensor and/or the magnetic element comprise an integral part of the microdevice. The magnetic element and the magnetic sensor are arranged relative to each other such that when the moveable part is displaced the change of the magnetic field at the magnetic sensor is detectable by use of the magnetic sensor.

13 Claims, 4 Drawing Sheets

MAGNETIC SENSING UNIT FOR DETECTING NANOMETER SCALE DISPLACEMENTS OR FLECTIONS

FIELD OF THE INVENTION

The present invention is related to magnetic sensing of motion in a microfabricated device. More particularly the invention relates to a magnetic sensing unit for measuring displacements or flections on a nanometer scale.

BACKGROUND OF THE INVENTION

The miniaturization of mechanical components and devices provides new applications in various fields and allows insight in and the use of a new world, the so called nano-world. At the end of the 20th century the basis for the age of micro- and nanomechanics has been created. Batch fabrication based on today's chip manufacturing methods has been introduced which provides considerable potential for creating high-performance systems and devices at low cost. Applications in the field of mass data storage achieve much smaller storage devices and opens up the possibility of achieving storage densities in the range of hundreds of gigabits per square inch. In the field of microscopy, for example, the scanning tunneling microscope (STM) and the atomic force microscope (AFM) has been introduced successfully in recent years for atomic-scale surface analysis. Such microscopy techniques, in general called scanning probe microscopy (SPM), use a flexible cantilever of very small dimension whereby the cantilever is fabricated by micro machining techniques. The cantilever with a sharp tip is scanned across a surface of a sample and the displacement or the motion of the cantilever is detected in order to achieve an image having an atomic resolution. A variety of optical methods have been devised to detect the cantilever deflection. Typical forces between tip and sample range from 6 to 11 nN, and deflections as small as 0.001 nm can be detected. The three different ways of operation are contact mode, non-contact or dynamic force mode, and tapping mode which allow the detection of lateral, magnetic, electrostatic and Van der Waals forces. Also, such a cantilever can be used to write and read data.

Although the present invention is applicable in a variety of micro mechanical applications it will be described with the focus put on an application to cantilevers.

Today, several techniques are known to measure displacements or the motion of cantilevers used in scanning probe microscopy (SPM), for example, or other microfabricated devices.

The optical technique, also referred to as laser detection or optical beam deflection, uses either the reflection of a laser beam at the surface of a cantilever and therewith the change of the laser beam's angle during deflection or the interference effects between the incident and reflected beams. The deflection of the cantilever is monitored by reflecting the laser beam off the cantilever into a photodiode. During scanning, an image can be formed by mapping this laser-detected deflection.

With a piezoresistive technique the change of resistance of a piezoresistive path defined at the surface of a flexed arm of the cantilever can be measured. In the article "Atomic force microscopy using a piezoresitive cantilever", by M. Tortonese et al., Proc. of the Int'l Conf. on Solid State Sensors and Actuators, San Francisco, Jun. 24–27, 1991, pp. 448–451, the fabrication of a silicon cantilever beam with an integrated piezoresistor for sensing its deflection is described. A silicon on insulator material was used for the fabrication.

From U.S. Pat. No. 5,345,815 a microminiature cantilever structure is known having a cantilever arm with a piezoresistive resistor embedded close to the fixed end of the cantilever arm. Deflection of the free end of the cantilever arm produces stress in the base of the cantilever. That stress changes the piezoresistive resistor's resistance at the base of the cantilever in proportion to the cantilever arm's deflection. A resistance measuring apparatus is coupled to the piezoresistive resistor to measure its resistance and to generate a signal corresponding to the cantilever arm's deflection.

U.S. Pat. No. 5,444,244 is related to a cantilever for a scanning probe microscope that includes a piezoresistor. A process of fabricating such a cantilever is further described, the process yielding a tip which has a high aspect ratio and a small radius of curvature at its apex. A combined atomic force/lateral force microscope including two or more piezoresistors responsive to both the bending and torsion of the cantilever is also disclosed.

However, piezoresistive cantilevers in spite of almost similar sensitivity as optical schemes, suffer from low frequency noise and temperature drift inherent to all semiconductor strain gauges. They require furthermore that the cantilevers be formed of single-crystal silicon.

IBM's U.S. Pat. No. 5,856,617 describes an atomic force microscope (AFM) that uses a spin valve magnetoresistive strain gauge integrated on the AFM cantilever to detect its deflection. The spin valve strain gauge operates in the absence of an applied magnetic field. The spin valve strain gauge on the AFM cantilever is made of a plurality of films, one of which is a free ferromagnetic layer that has nonzero magnetostriction and whose magnetic moment is free to rotate in the presence of an applied magnetic field. In the presence of an applied stress to the free ferromagnetic layer due to deflection of the cantilever, an angular displacement of the magnetic moment of the free ferromagnetic layer occurs, which results in a change in the electrical resistance of the spin valve strain gauge. An electrical resistance detection circuitry coupled to the spin valve strain gauge is used to determine cantilever deflection.

Document WO 96 03641 is related to a scanning probe microscope assembly that has an atomic force measurement (AFM) mode, a scanning tunneling measurement (STM) mode, a near-field spectronomy mode, a near-filed optical mode, and a hardness testing mode for examining an object.

The European patent application EP 0 397 416 A1 describes an apparatus for the high resolution imaging of macromolecules and interactions involving macromolecules. The apparatus comprises a surface on which the macromolecule under test is placed and a plurality of fine probes. Means are provided for scanning each of the probes across a small area of the surface in such a way that the total output from the probes covers the whole surface. Means such as a scanning tunneling and/or atomic force detector are used to monitor the movement of the individual probes in a direction transverse to the surface and display means are used to display the transverse movement of the probes, being illustrative of the topography of the surface.

An other European patent application EP 0 306 178 A2 is related to an acceleration sensor including a cantilever beam having a free end to which a permanent magnet is attached. A pair of magnetic sensors, each consisting of a barber-pole type magnetoresistive sensing element, are arranged opposite to and symmetrically with respect to the magnet. The cantilever is bent and the magnet is moved according to an acceleration, which is detected as outputs from the magnetoresistive sensing elements.

The German publication DE 41 03 589 A1 is related to a sensor device with a mechanical resonant oscillation element. The structure is similar to that of the acceleration sensor mentioned in the preceding paragraph with the little difference that only one sensor element is arranged in the prolongation of the beam.

U.S. Pat. No. 4,954,904 is related to an apparatus and method for controlling the flying height of a head over a rotating medium, such as used in a rigid disk drive employing magnetic, magneto-optic or optical recording techniques. The flying height is controlled via magnetic attraction or repulsion to maintain a selected and substantially uniform flying height of the head with respect to the rotating medium.

The optical technique and the piezoresistive technique are the most widely used techniques today. But other techniques, like capacitive, piezoelectric, or thermal techniques, can also be used instead of the optical or piezoresistive technique to detect the deflection of a cantilever or microdevice. The capacitive or electrostatic technique measures the change in capacity of a capacitor formed by the cantilever and a fixed reference electrode. The thermal technique uses a current at different wiring levels, for example, to heat parts of a microdevice.

Deflection detection techniques which are external to the cantilever require time-consuming alignments. A variety of feedback mechanisms can be used to acquire data and to maintain proper tip position.

The combination and integration of microfabricated devices with electronically controlled functionalites facilitates nanotechnological applications, characterized by precise movements, increased sensing, and actuation.

SUMMARY OF THE INVENTION

It is an object of the present invention to overcome the disadvantages of the prior art.

It is another object of the present invention to provide an alternative measuring method with an increased sensitivity.

It is still another object of the present invention to provide an integrated system for measuring displacements on a microfabricated device without the need of additional equipment for alignment.

It is further object of the present invention to present a detection system which is simple implementable and can be fabricated at low-cost These objects of the invention are achieved by the features of the enclosed claims. Various modifications and improvements are contained in the dependent claims.

The present invention provides a contactless magnetic sensing system for measuring relative displacements on a nanometer scale. Such a system can be used in a microdevice (i.e., a microfabricated device). The invention is based on the measurement of the field B of a magnetic dipole located on a moveable part by use of a sensitive magnetic sensor placed on an adjacent fixed part. The magnetic sensor can also be arranged at the moveable part and the magnetic dipole, also referred to as magnetic element, at the fixed part. However, the magnetic sensor should be positioned properly with respect to the magnetic element in order to take advantage of the largest field gradient dB/dz, of the field and thus optimize the sensitivity. The sensitivity of such a magnetic sensing or detection system according to the present invention can be at least 10 times better than for the known piezoresistive technique and offers the advantage over optical techniques to be fully integrated on a device without the need of special optical access. The magnetic sensing or detection system can easily be implemented into Si technology with standard photolithography. Different magnetic materials, geometries, and sensing configurations can be proposed to optimize further the sensitivity.

As a first embodiment it is proposed to measure the deflection of an investigation and/or manipulation device. For that, the investigation and/or manipulation device comprises a cantilever, also referred to as moveable part, a magnetic element generating a magnetic field, and a magnetic sensor detecting it. The moveable part is attached to the fixed part and further comprises a free end with a tip. The magnetic element is located on the moveable part and the magnetic sensor on the fixed part. On the other hand it is also possible that the magnetic sensor is located on the moveable part and the magnetic element on the fixed part. At least one magnetic element and at least one magnetic sensor form a magnetic sensing unit. The magnetic sensor and/or the magnetic element can be integrated into the investigation and/or manipulation device such that they form an integral part of the investigation and/or manipulation device. The magnetic element and the magnetic sensor are arranged relative to each other such that when the moveable part is displaced the change of the magnetic field at the magnetic sensor is detectable by use of the magnetic sensor. Subsequent measuring facilities process the information obtained by the sensor and derive a characteristic value that is representative of the displacement or torsion of the investigation and/or manipulation device.

However the field of applications extends to a broader range of devices where relative motion or positioning needs to be controlled, and possible in devices where moving parts need a fast and sensitive feedback, e.g. flying heads or actuators.

If the magnetic sensor can be arranged opposite to the magnetic element, then the advantage occurs that the field of the magnetic element penetrates the magnetic sensor and a field gradient, preferably the maximal field gradient, can be detected and determined.

The magnetic sensor can be used for contactless detection which is especially advantageous since no frictional losses occur and the sensitivity is optimized. The deflection or motion of the moveable part is free and not damped or hindered.

When a large portion of the moveable part is separated from the fixed part by a gap, then the advantage occurs that a wide and free deflection or motion of the moveable part can be guaranteed with an enlarged measurable range.

The magnetic element can be a permanent magnet, which has the advantage to provide a constant magnetic field. There is no need for an external magnetic field nor for a built-in solenoid with additional wires. Hence no current is required which could lead to unwanted heating effects.

The magnetic element comprises a magnetic layer that can be made of Fe, $Fe_2O_3$, Ba, Co, Cr, Mg, Mn, Ni, Pt, Sr, V, or alloys thereof, or made of one of the following components: AlNiCo, FeCoCr, FeCoV, FeCoVCr, FeNiCo, NdFeB, SmCo. Also, the magnetic layer can comprise crystalline or amorphous metals, e.g. an alloy of AlNiCo-type, a platinum-cobalt alloy, an iron-cobalt-vanadium (chromium) alloy, a chromium-iron-cobalt alloy, a rare earth cobalt alloy, or a rare earth iron alloy. The magnetic layer can be made of a plurality of materials and components, preferably made of a hard magnetic material as listed above, whereby these materials and components can be adapted according to the application.

If the magnetic sensor can be integrated into or on top of the flexible or fixed part, such that the magnetic sensor is an integral part of the microdevice, then the advantage occurs that the magnetic sensor is pre-installed and does not need to be aligned before use.

If the microdevice comprises silicon and the magnetic sensor is integrated into the silicon, then the advantage occurs that Si technology with standard photolithography can be applied.

The magnetic sensor can be a Hall sensor, a magnetotransistor, magnetodiode, or a giant magnetoresistive sensor. This shows the advantage that several types of sensor can be used.

The magnetic sensor can be arranged such that the magnetic sensor and a subsequent measuring device or system are able to determine a field gradient of the magnetic field. By this subsequent measuring device or system a characteristic value that is representative of the respective deflection or motion can be derived for further processing.

The moveable part and the fixed part can be made of the same material. This might be advantageous for a simple fabrication process. But on the other hand, the moveable part and the fixed part can also be made of different materials, whereby the flexible and fixed part have different mechanical or physical properties.

If the moveable part is attached to the fixed part by attachment means, preferably by a leg, then the advantage occurs that the moveable part shows a free and smooth displacement. If the attachment means comprises an aperture, such as a hole or a slit, or one or more constrictions, then the effective width of the attachment means can be reduced leading to a reduction of the spring constant for higher sensitivity. Similarly, the thickness of the moveable part can be adjusted for optimal sensitivity.

It is especially advantageous if the magnetic element and the magnetic sensor are arranged within the microdevice such that a mechanical amplification increases the sensitivity of the magnetic sensing system. This can be achieved if the moveable part projects into the fixed part of the microdevice. If the moveable part and the fixed part are arranged in the same plane and more length of the moveable part projects into the fixed part than protrudes out of the fixed part, then the sensitivity is increased advantageously because of the mechanical amplification ratio.

When the microdevice comprises a plurality of magnetic sensors and at least one magnetic element forming together a magnetic sensing unit and further the magnetic sensors are arranged in the vicinity of the magnetic element, then the advantage occurs that the signal amplitude by use of multiple sensors can be increased. On the other hand, when the microdevice comprises a plurality of magnetic elements and at least one magnetic sensor forming also together a magnetic sensing unit and further the magnetic elements are arranged in the vicinity of, or around the magnetic sensor, then the advantage occurs that the sensitivity can be increased without an increase of noise, as it would occur in other systems.

An arrangement of such magnetic sensing units for a magnetic detection system can be realized by a meander-shaped gap that separates the moveable part form the fixed part and therewith the magnetic element(s) from the magnetic sensor(s), respectively. The magnetic sensors and elements can be arranged appropriately in a row within the meander. It is also possible is to arrange at least two magnetic sensors in the vicinity of one magnetic element, which is useful for the detection of torsion. It should be noted that there are several possibilities to arrange a magnetic sensing unit. In the most cases the design depends on the application.

It is also possible that the microdevice comprises a plurality of moveable parts and at each moveable part at least one magnetic element and at least one magnetic sensor. A plurality of detection systems, e.g. for different measurements, can be arranged or combined within such a microdevice.

DESCRIPTION OF THE DRAWINGS

The invention is described in detail below with reference to the following schematic drawings.

All the figures are for the sake of clarity not shown in real dimensions, nor are the relations between the dimensions shown in a realistic scale.

DETAILED DESCRIPTION OF THE INVENTION

Figure 1:
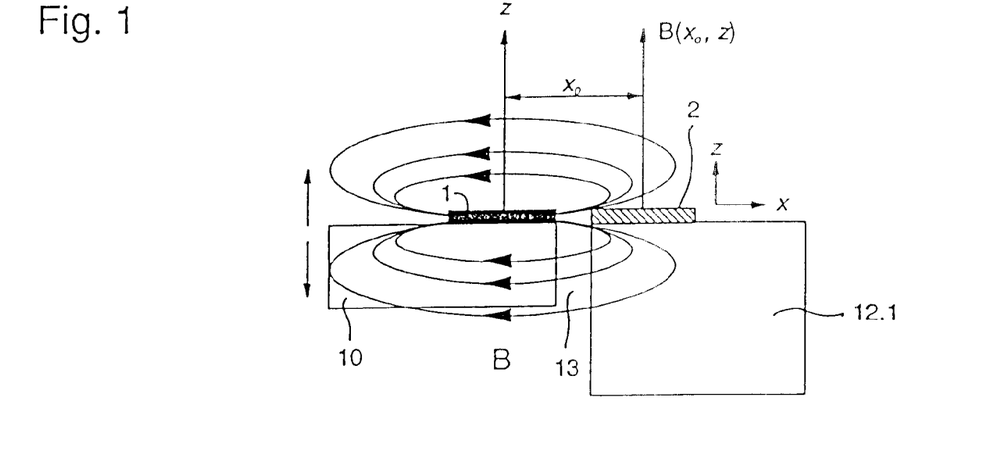
FIG. 1 shows a schematic illustration of a magnetic detection system with a magnetic sensing unit according to the present invention.

The principle of a magnetic gradient detection scheme is given in FIG. 1. At first, some basics of a magnetic deflection detection system, also referred to as magnetic detection system, according to the present invention are addressed.

Among different types of magnetic sensors which can be used in accordance with the present invention and can be simply integrated in silicon, e.g., magnetotransistor, magnetodiode, giant magnetoresistance, or Hall sensor, only the case of Hall sensor is discussed here. Such sensor can be built simply in a planar or cylindrical geometry, with small size directly by doping the silicon.

The active Hall region is formed in an epitaxial layer and the geometry of the cell is defined by deep p+ isolation diffusion. The current electrodes and Hall electrodes are formed by a shallow n+ diffusion. The surface can be covered by an inversion layer to minimize the intrinsic noise. The sensitivity is defined by $S_H = V_H/(I\ B)$, where $V_H$ is the Hall voltage, I is the supply current and B the applied magnetic field. For a device of a thickness below 20 $\mu$m, a typical sensitivity of 400 V/AT can be reached, as described in Mechanical Sensors, Vol. 7, Edts Gopel, J. Hesse, J. N. Zemel, VCH Verlag, (1994) p. 181.

In a cylindrical configuration, with ferromagnetic concentrators, $S_H = 2000$ V/AT can be reached, as described in H. Blanchard et al., EPFL Lausanne, IEEE, 1996, and R. S. Popovic, Hall sensors, Adam Hilger Bristol, Philadelphia, N.Y., 1991. Techniques to compensate the thermal drifts and minimize l/f noise are known. In particular the Hall voltage can be measured at rather high frequency (<400 kHz) by locking techniques. In the last configuration, the equivalent output drift due to the noise at 1 Hz is 2.5 $\mu$T.

A magnetic element, used in accordance with the present invention, has a permanent magnet with strong and stable moment with respect to the surrounding perturbations and to temperature.

Different geometries can be thought to optimize the magnetic stray field of this magnetic element. One approach is to have a magnetic layer or thin film with rectangular cross section: thickness t of a few hundreds nm to 10 $\mu$m, width w of several tens of $\mu$m and a length l which fits to the size of the microdevice. The thickness should be such that the layer does not perturb the mechanical properties of the microdevice or the investigation and/or manipulation device, for example, but leaves a final volume large enough for a good size magnetic moment and leads to a strong field gradient at the sensor location. The choice of the layer or film material with large remanence can be a magnetic recording compound used in the storage media like Co(Cr, Pt) alloy, or Fe which has a slightly larger saturation moment, or $Fe_2O_3$ as used in magnetic tape. Also possible are Co, Ni, Mn, Mg, V, Cr, Pt, Ba, Sr, or alloys thereof, or further one of the following components: AlNiCo, FeNiCo, NdFeB, FeCoVCr. However, it should be a material easy to deposit, for example by a standard method on silicon. A slightly more complicated way is to imbed small particles of SmCo in a polymer, orient the particles in a magnetic field and glue it on the silicon surface with the appropriate orientation. This can be used to create layers with a thickness of 30 $\mu$m.

For an estimation of sensitivity, a cuboid-shaped layer of Co with a saturation magnetization of $M_s$=163 emu/g=1.745 $Am^2/cm^3$ and of size 50×50×10 $\mu m^3$ is considered. This volume of V=2.5×10$^{-8}$ $cm^3$ and a total magnetic moment $m_x$=3.63×10$^{-8}$ $Am^2$.

One can approximate the field distribution along the z-direction of the layer by that of a point magnetic dipole. At a given distance $x_0$ the field change along z can be calculated as being:

$$B_z = A * \left(m_x * \frac{z}{x^4}\right)\left[1 + \frac{y^2+z^2}{x^2}\right]^{-\frac{5}{2}}$$

with A=3×10$^{-7}$ VS/Am, B in Tesla and x in m.

Using the above relation one can calculate the field B($x_0$, $y_0$,z) and its gradient along z in order to choose the best conditions.

For an estimate of the overall sensitivity of the magnetic detection system according to the present invention it is assumed that the Hall sensor has a lateral size of 20 $\mu$m (along x) and is separated by a gap of 2 $\mu$m from the magnetic layer of size 50×50×10 $\mu m^3$. By integrating the relation for $B_z$ over the actual dimensions of the magnetic layer one can calculate the field B($x_0$, z) and its gradient dB/dz at the center of the Hall sensor.

The resolution in deflection $\Delta z$ of an investigation and/or manipulation device having a lever can be estimated by using the equation:

$$\frac{\Delta V}{\Delta z} = I \times S_H \times \frac{\Delta B}{\Delta z}$$

For a typical current of I=1 mA without heating effects, $S_H$=400 V/TA and the Co layer mentioned above with the magnetic moment $m_x$=3.63×10$^{-8}$ $Am^2$, the sensitivity can be estimated to be $\Delta V/\Delta z$=6 $\mu$V/nm.

The following Table 1 displays some typical sensitivity values versus distance which can easily be reached.

TABLE 1

| $x_0$ ($\mu$m) | $\Delta B/\Delta z$ (T/nm) | $\Delta V/\Delta z$ ($\mu$V/nm) |
|---|---|---|
| 20 | 6.8 10$^{-5}$ | 27 |
| 40 | 4.25 10$^{-6}$ | 1.7 |
| 80 | 2.66 10$^{-7}$ | 0.11 |

A piezoresistive lever sensitivity, on the other hand, can be $\Delta V/\Delta z$=1.25 $\mu$V/nm at best. This fact shows that with a magnetic sensing system or magnetic detection system according to the invention a sensitivity 10 or more times better can be reached than the piezoresistive case. Increasing the sensitivity can be achieved also by choosing other materials, e.g., Fe having larger saturation magnetization or even by a SmCo layer instead of Co. Further, the sensitivity can be increased by including a mechanical amplification ratio R>1 or by multiplying the number of sensors, as described in more detail below.

FIG. 1 shows a schematic illustration of the magnetic detection system with a magnetic sensing unit according to the present invention in a cross-section with additional physical sizes that can be part of a microdevice. A magnetic dipole 1, also referred to as magnetic element 1, is arranged on a moveable part 10 at one side of this moveable part 10. The moveable part 10 with the magnetic element 1 can be displaced within the z-direction, as indicated by the arrows beside the moveable part 10. A first reference part 12.1 as an extension or part of a fixed part is separated from the moveable part 10 by a gap 13. A magnetic sensor 2 is placed on the first reference part 12.1 towards the gap 13. The magnetic sensor 2 can be integrated into silicon or in the material of the microdevice in such a way that it is an integral part of it. Also, the magnetic element 1 can either be an integral part of the moveable part 10 or it can be stuck or glued onto the moveable part 10. Integral part means that the magnetic element 1 and/or the magnetic sensor 2 are an essential constituent part of the microdevice. There can also be a device on the microdevice where the magnetic element 1 or the magnetic sensor 2 are positioned. The magnetic sensor 2 is arranged in the vicinity of the magnetic element 1 in order to detect and measure a high field gradient, preferably the highest field gradient. In other words, the magnetic element 1 and the magnetic sensor 2 are arranged relative to each other such that when the moveable part 10 is displaced within the z-direction the change of the magnetic field B at the magnetic sensor 2 can be detected by use of the magnetic sensor 2. The magnetic field B is indicated by field lines penetrating the magnetic sensor 2. The magnetic field B($x_0$, z) and its gradient can be calculated. If the moveable part 10 is deflected, then the magnetic field B at the magnetic sensor 2 changes. The change of the magnetic field B is then proportional to the deflection amplitude of the moveable part 10. Any material can be used for making such a microdevice or an investigation and/or manipulation device. It can be a single material or a combination of two or more materials.

In the following, the various exemplary embodiments of the invention are described on hand of an example of an investigation and/or manipulation device used in scanning probe microscopy.

Figure 2:
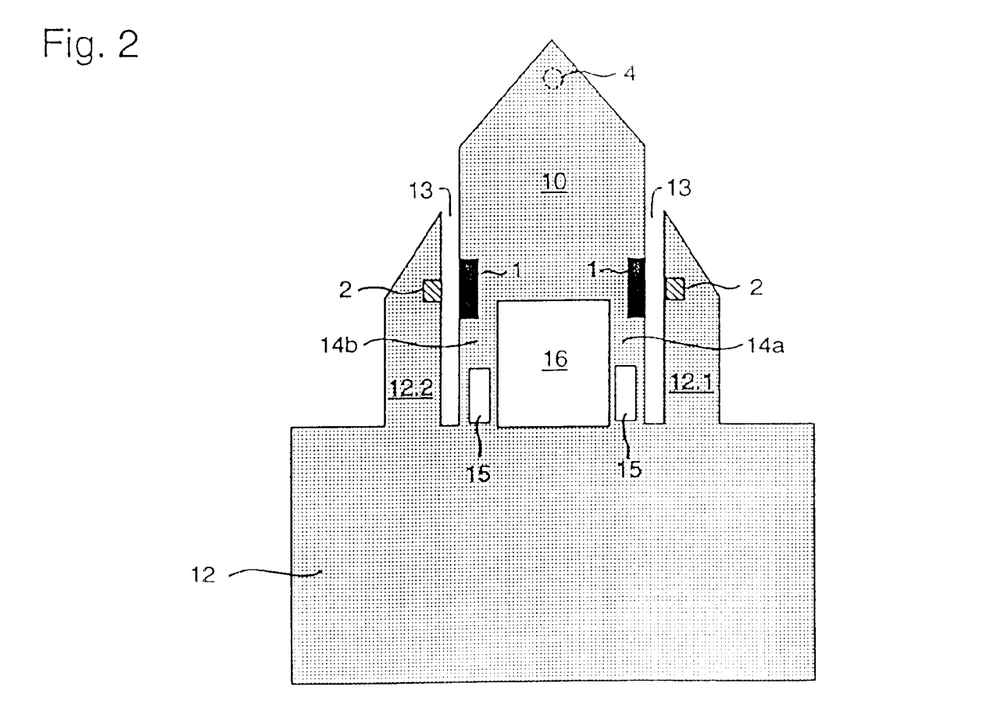
FIG. 2 shows a top-plan view of a typical investigation and/or manipulation device with a magnetic detection system with two magnetic sensing units according to the present invention.

Referring to FIG. 2, the investigation and/or manipulation device with the magnetic detection system according to the present invention is depicted in top-plan view and shows two magnetic sensing units. By the way, the above described FIG. 1 can be regarded as a zoomed detail of FIG. 2, namely where the magnetic element 1 and the magnetic sensor 2 are arranged, whereby the same numbering for the same parts is used. As shown in FIG. 2, the investigation and/or manipulation device has a cantilever or lever 10, hereafter referred to as moveable part 10, as The sharp tip 4 is normally placed on the bottom. By the way, this sharp tip 4 allows the investigation or manipulation of a sample or sample surface, that for the sake of clarity is not depicted in the figure. From the moveable part 10 extends an attachment means 14a, 14b that here has two flexible legs 14a and 14b to allow flexion and torsion of the moveable part 10. For sure, such an investigation and/or manipulation device can also have more than two legs. In the article "Piezoresistive cantilever designed for torque magnetometry", by M. Willemin et al., J. Appl. Phys. 83 (3), Feb. 1 ,1998, pp. 1163–1170, cantilevers with attachment means to detect the torque in two directions corresponding to flexion and torsion are described. Each flexible leg 14a, 14b comprises an aperture 15 that here is a slit 15, but it can also have one or more holes or constrictions of any shape which enhance the flexibility. The two flexible legs 14a and 14b reach to a support or mounting section 12, hereafter referred to as fixed part 12. The moveable part 10 on one side, the fixed part 12 on the opposite side and each flexible leg 14a, 14b on the other sides, respectively, define a square-shaped opening 16 within the investigation and/or manipulation device. The platform of the movable part 10 is essentially more rigid as compared to the attachment means 14a, 14b in order to have an approximately linear relation between the deflection of the tip 4 and the magnetic element 1 whereby on each side of the moveable part 10 or within the platform such a magnetic element 1 is positioned closed to the gap 13. The fixed part 12 is used for mounting purposes. Beside the moveable part 10 and the flexible legs 14a and 14b, the first reference part 12.1 and a second reference part 12.2 are extending from the fixed part 12, respectively, whereby each cuboid-shaped reference part 12.1, 12.2 is in this view beveled at its free end to leave the end of the movable part 10 with its tip 4 free. The free end of each reference part 12.1, 12.2 reaches approximately half the length of the moveable part 10. Each reference part 12.1 and 12.2 is separated from the moveable part 10 by the gap 13. The gap 13 can also be filled with a fluid or any other appropriate material. The reference parts 12.1, 12.2 are rigid in comparison to the deflectable moveable part 10 which is advantageous for reference purposes. On each reference part 12.1 , 12.2, a magnetic sensor 2, that here is a Hall sensor 2, is positioned towards the gap 13 and the moveable part 10. Each magnetic element 1, arranged on the moveable part 10, faces its respective magnetic sensor 2 and forms a magnetic sensing unit. The magnetic element 1 is oriented in such a way that a maximal field gradient can be detected by use of the magnetic sensor 2. One magnetic element 1 and one magnetic sensor 2 together form here a magnetic deflection detection system or short magnetic detection system on the respective side of the moveable part 10 in order to enable together the measurement of the flexion and torsion of the moveable part 10. This can be achieved if the magnetic element 1 and the magnetic sensor 2 are arranged relative to each other such that when the moveable part 10 is displaced the change of the magnetic field at the magnetic sensor 2 is detected by use of the magnetic sensor 2. Several configurations between the magnetic sensor 2 and the magnetic element 1 are possible. That means there are different alternatives to arrange a magnetic detection system, e.g. in a vertical arrangement.

For the sake of clarity, no further parts of a measuring device, e.g. wires, processing units, or display units, are depicted but the information obtained by use of the magnetic sensor 2 are processable as known from the state of the art.

Figure 3:
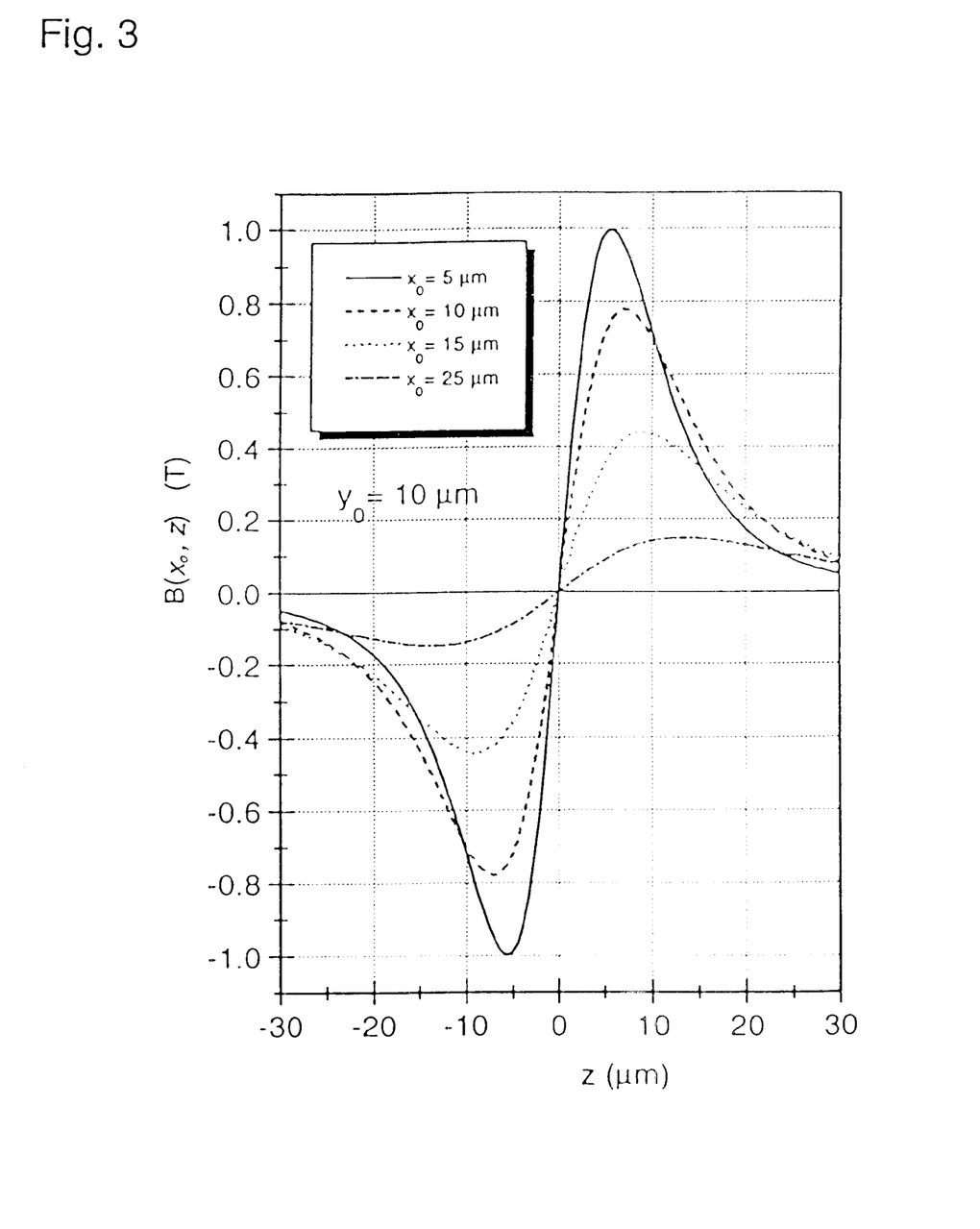
FIG. 3 shows the magnetic field dependence $B(x_0, y_0, z)$ along the z-direction as produced by a magnetic element (dipole) located at four different distances $x_0$, whereby $y_0$ is maintained constant.

FIG. 3 shows several plots of the dipole field amplitude $B(x_0, y_0, z)$ at four different distances $x_0$, with $x_0=5$ $\mu$m, 10 $\mu$m, 15 $\mu$m, and 25 $\mu$m. The abscissa indicates the distance z in $\mu$m whereas the ordinate indicates the magnetic field $B(x_0, z)$ in Tesla. As can be seen, the field has an almost linear slope around z=0. Its value is larger at shorter distances, thus for highest sensitivity it is favorable to place the magnetic sensor 2 close enough to the magnetic element 1. The magnetic sensor 2 should be also thin enough, i.e. less than the peak to peak distance, to prevent the averaging over the positive and negative sides of the $B(x_0, z)$ curves.

Figure 4:
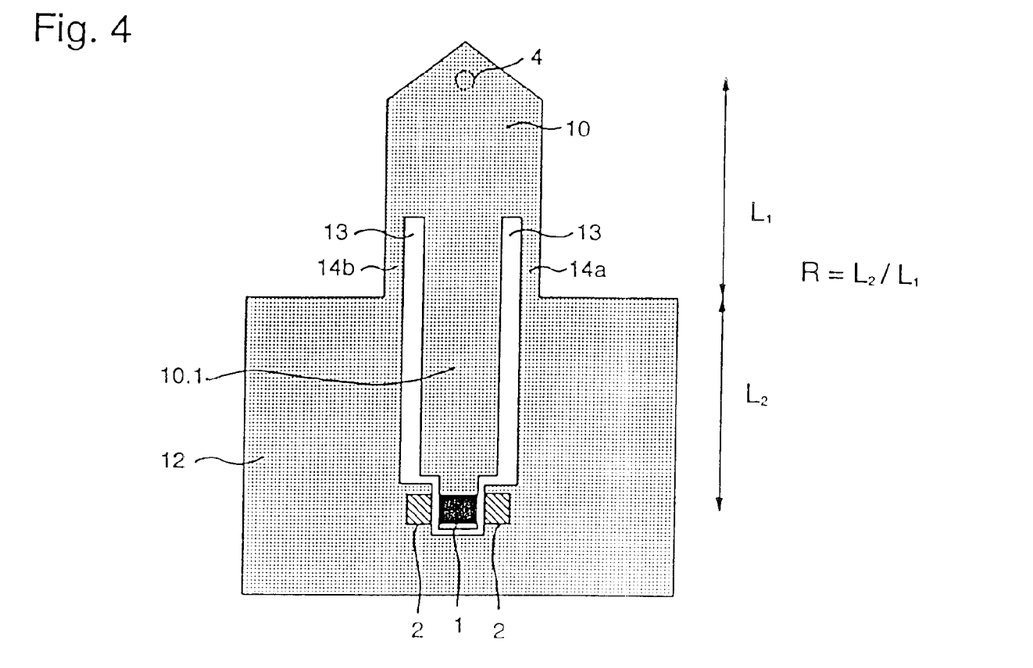
FIG. 4 shows another embodiment of the investigation and/or manipulation device with a magnetic detection system, according to the present invention, using mechanical amplification.

FIG. 4 shows another embodiment of the investigation and/or manipulation device using mechanical amplification. For simplification purposes, the same numbering for the same parts is used. The configuration according to FIG. 2 can be modified to amplify the deflection amplitude $\Delta z$ at the position of the magnetic sensor 2 which is here smaller than the tip deflection. The general approach, and thus the main difference to FIG. 2, is to extend the moveable part 10 with a free arm or central beam 10.1 in the opposite direction, i.e. towards the fixed part 12. A first length $L_1$ indicates the part of the moveable part 10 that protrudes from the fixed part 12 and on the other hand a second length $L_2$ indicates the part of the moveable part 10, that here is called the central beam 10.1, that projects into the fixed part 12. The moveable part 10 is attached to the fixed part 12 by use of flexible legs 14a, 14b. The ratio of the respective lengths $L_2$ and $L_1$ can be made larger than 1. The magnetic detection system is arranged at the end of this central beam 10.1, whereby here only one magnetic element 1 is placed at the very end of this central beam 10.1. Beside the magnetic element 1, two magnetic sensors 2 are arranged on the fixed part 12 that here includes the function of the reference part in order to enhance the sensitivity and to detect torsion. The magnetic element 1 is separated from the two sensors 2 by the gap 13 again. The approach is particularly suited in contact mode. The central beam 10.1 should be rigid in comparison to the other part of the moveable part 10 in order to transfer correctly the z motion or deflection of the tip 4 to the magnetic detection system. The mechanical amplification is given by $R=L_2/L_1$ with $L_2>L_1$. The mechanical amplification can be used to increase further the sensitivity by adapting the respective length $L_2$ or $L_1$ to the application. An other advantage of placing the magnetic element 1 and magnetic sensor 2 far from the tip 4 is to minimize the interaction with the surface which might be magnetic or not.

An additional way for increasing the sensitivity of the magnetic detection system is naturally to augment the number of sensors 2 so to have a larger output signal. This can be achieved, for example, by fabricating an array on a comb structure as shown in the following figure.

Figure 5A:
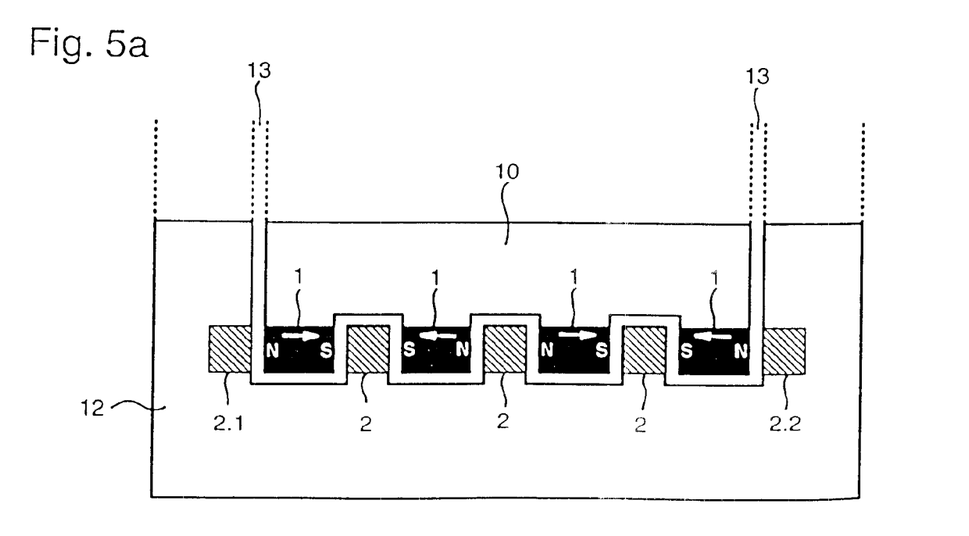
FIG. 5a shows an embodiment with multiple magnetic sensing units for enhanced sensitivity.

FIG. 5a shows an embodiment using multiple magnetic sensing units for enhanced sensitivity, whereby only the relevant parts with the magnetic detection system of the investigation and/or manipulation device are depicted. The protruding parts, e.g. the free end with the tip, are not shown for simplification purposes and are therefore only indicated by dash-and-dot lines. The foregoing embodiments can be varied in that the end of the moveable part 10 or the central beam 10.1 ends in a meander-shaped form. Any other appropriate shape is possible as well. The meander separates the moveable part 10 from the fixed part 12 by the gap 13. As mentioned above, the fixed part 12 is rigid in comparison to the moveable part 10 in order to have reference. As can be seen in top view, in each protuberance of the meander a single magnetic element 1 is positioned within a row. On the other hand, in each respective counterpart at the fixed part 12 magnetic sensors 2 are positioned within a row. Beside the end of the moveable part 10 also a left side sensor 2.1 and on the other side a right side sensor 2.2 are positioned on the fixed part 12. The magnetic orientation of the magnetic elements 1 should be arranged properly as indicated by an arrow within the magnetic elements 1 in FIG. 5a in order to avoid negative mutual influences, whereby N stands for north pole or "+" and S for south pole or "-".

The arrangement shown in FIG. 5a allows an enhancement of the output signal or sensitivity by multiplying the number of magnetic sensing units.

Figure 5B:
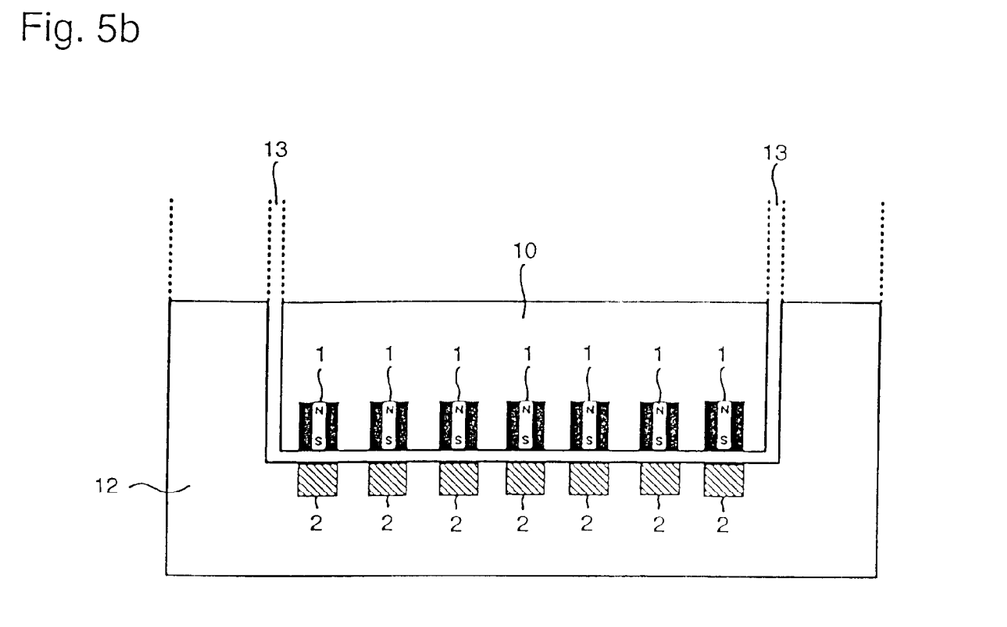
FIG. 5b shows a further embodiment with multiple magnetic sensing units for enhanced sensitivity.

FIG. 5b shows a further embodiment using multiple magnetic sensing units for enhanced sensitivity, whereby again only the relevant parts of the investigation and/or manipulation device are depicted. The embodiment is varied in that the end of the moveable part 10 ends in a rectangular-shaped form. Multiple magnetic elements 1 are arranged within a row at the end of the moveable part 10. On the other hand, multiple magnetic sensors 2 are also arranged within a row on the fixed part 12. Both rows are separated by the gap 13 but the rows are arranged such that each magnetic element 1 faces directly one respective magnetic sensor 2. As mentioned above, the magnetic elements 1 should be arranged properly in order to not influence negatively the adjacent magnetic sensing unit.

Any disclosed embodiment may be combined with one or several of the other embodiments shown and/or described. This is also possible for one or more features of the embodiments.

What is claimed is:

1. A magnetic sensing unit for measuring displacements between a moveable part and a fixed part of a microdevice, comprising a magnetic element having a magnetic field; and
   a magnetic sensor;
   said magnetic element being located on said moveable part and said magnetic sensor on said fixed part, or said magnetic sensor being located on said moveable part and said magnetic element on said fixed part;
   said magnetic sensor and/or said magnetic element being an integral part of said microdevice;
   said magnetic element and said magnetic sensor being arranged relative to each other such that when said moveable part is displaced the change of said magnetic field at said magnetic sensor is detectable by use of said magnetic sensor; and
   said magnetic element and the magnetic sensor being arranged within the microdevice such that a mechanical amplification increases the sensitivity of said magnetic sensing unit.

2. The magnetic sensing unit according to claim 1, whereby the moveable part projects into the fixed part of the microdevice.

3. The magnetic sensing unit according to claim 1, whereby the moveable part and the fixed part are arranged in the same plane and more length of the moveable part projects into the fixed part than protrudes out of the fixed part.

4. The magnetic sensing unit according to claim 1, whereby the magnetic element comprises a magnetic layer, preferably made of a hard magnetic material.

5. The magnetic sensing unit according to claim 1, whereby the magnetic sensor is a hall sensor, a magnetotransistor, a magnetodiode, or a giant magnetoresistive sensor.

6. The magnetic sensing unit according to claim 1, whereby the magnetic sensor is arranged such that the magnetic sensor and a subsequent measuring device are able to determine a field gradient of the magnetic field.

7. The magnetic sensing unit according to claim 1, whereby the moveable part is attached to the fixed part by attachment means, preferably by a leg, and said attachment means allows free displacement of said moveable part.

8. The magnetic sensing unit according to claim 7, whereby the attachment means comprises an aperture or a constriction.

9. The magnetic sensing unit according to claim 1, whereby the microdevice comprises a plurality of moveable parts and at each moveable part at least one magnetic element and at least one magnetic sensor.

10. The magnetic sensing unit according to claim 1, whereby the magnetic element and the magnetic sensor are separated by a meander-shaped gap 40.

11. The magnetic sensing unit according to claim 1, wherein said sensing unit is part of a micromechanical device, such as a cantilever or a flying head of a storage device.

12. An investigation and/or manipulation device for a sample, comprising a moveable part having a free end with a tip, said moveable part being attached to a fixed part;
   a magnetic element having a magnetic field;
   a magnetic sensor;
   said magnetic element being located on said moveable part and said magnetic sensor on said fixed part, or said magnetic sensor being located on said moveable part and said magnetic element on said fixed part;
   said magnetic sensor and/or said magnetic element being an integral part of said cantilever;
   said magnetic element and said magnetic sensor being arranged relative to each other such that when said moveable part is displaced the change of said magnetic field at said magnetic sensor is detectable by use of said magnetic sensor; and
   said magnetic element and the magnetic sensor being arranged within the device such that a mechanical amplification increases the sensitivity of said device.

13. The investigation and/or manipulation device according to claim 12, whereby at least one magnetic element and at least one magnetic sensor are positioned for the detection of flexion and/or torsion of the moveable part.

\* \* \* \* \*